Oct. 12, 1965     W. STELZER     3,210,941
PRESSURE PROPORTIONING MASTER CYLINDER
Filed Jan. 11, 1965     2 Sheets-Sheet 1
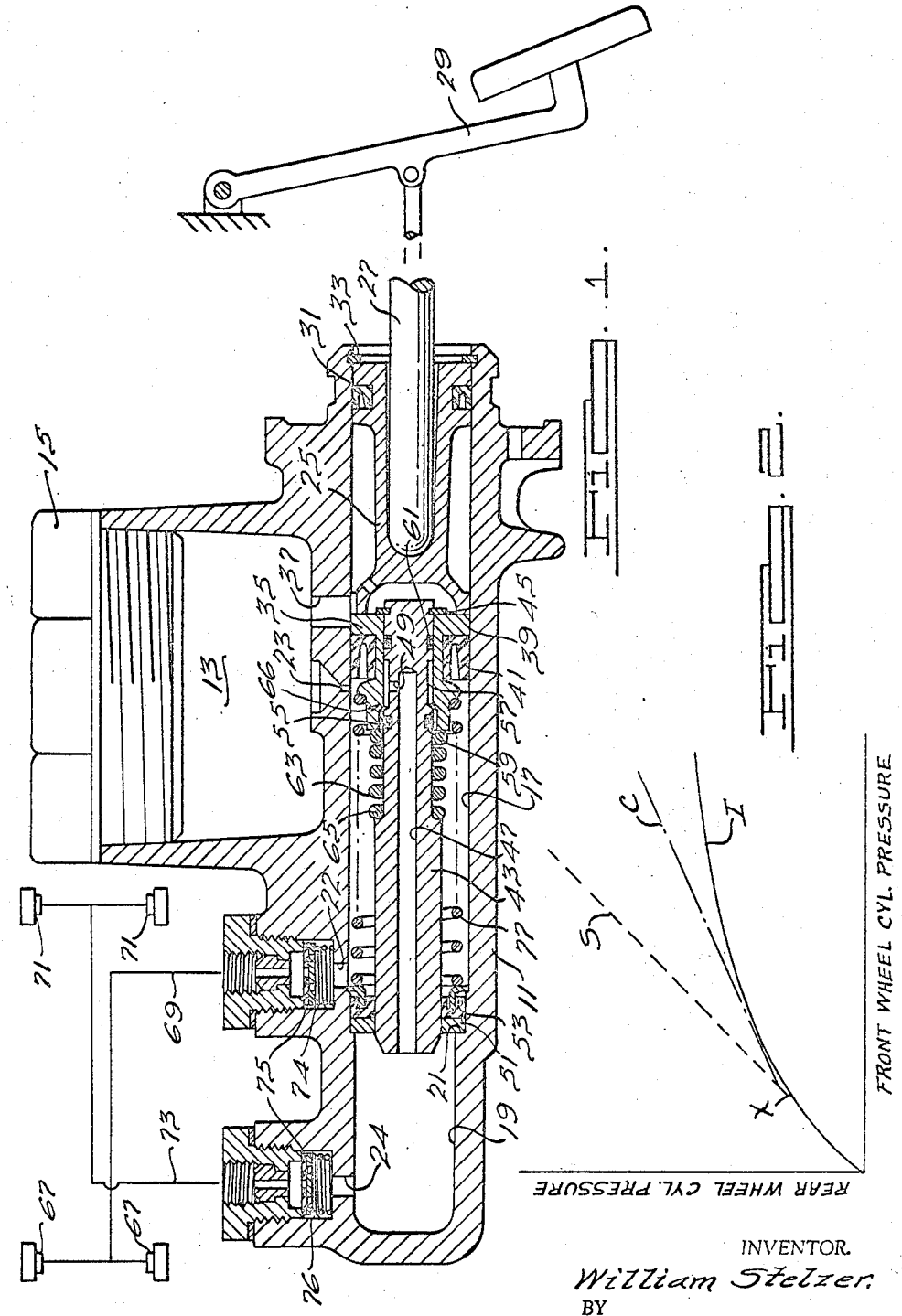
INVENTOR.
William Stelzer,
BY
Harness, Dickey & Pierce
ATTORNEYS.

Oct. 12, 1965  W. STELZER  3,210,941
PRESSURE PROPORTIONING MASTER CYLINDER
Filed Jan. 11, 1965  2 Sheets-Sheet 2
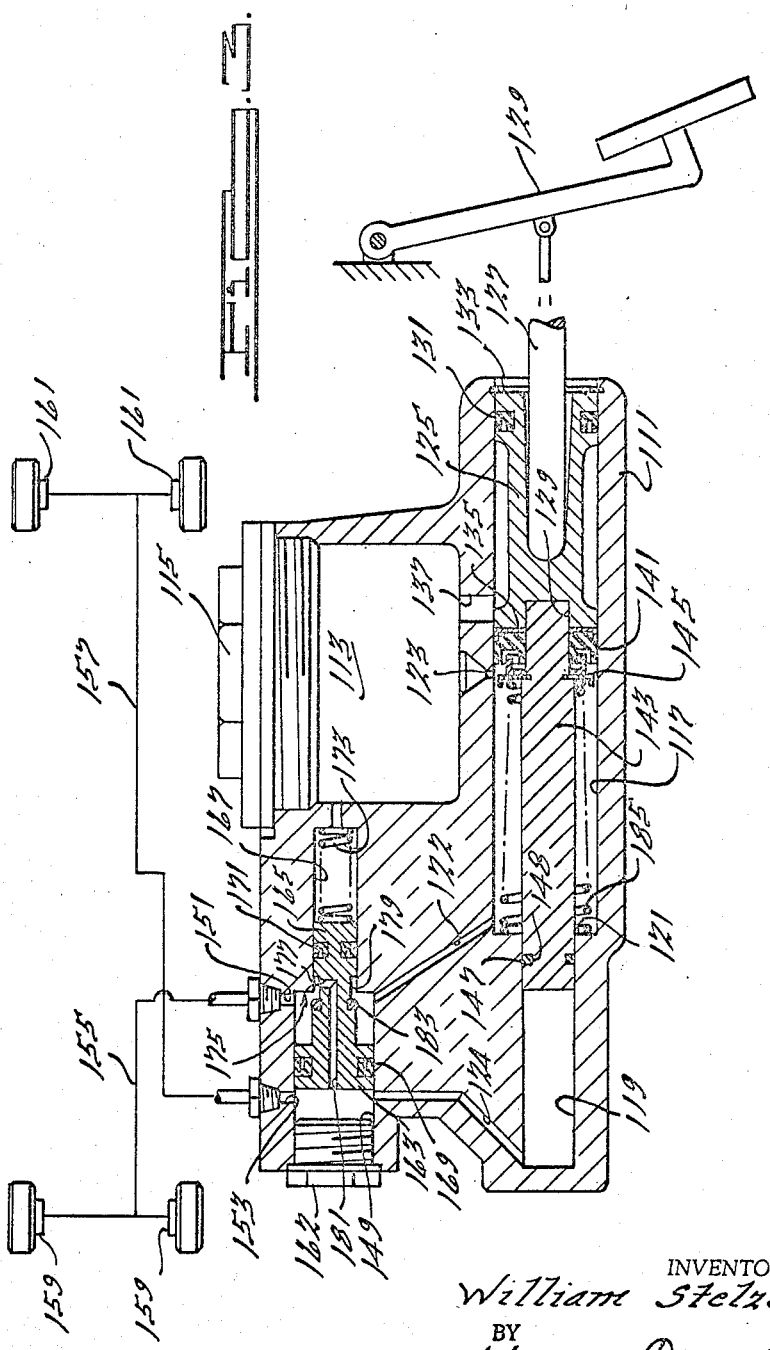
INVENTOR.
William Stelzer.
BY
Harness, Dickey & Pierce
ATTORNEYS.

United States Patent Office
3,210,941
Patented Oct. 12, 1965

3,210,941
PRESSURE PROPORTIONING MASTER CYLINDER
William Stelzer, Bloomfield Hills, Mich., assignor to Kelsey-Hayes Company, Romulus, Mich., a corporation of Delaware
Filed Jan. 11, 1965, Ser. No. 424,619
19 Claims. (Cl. 60—54.5)

This invention relates generally to a vehicle hydraulic brake system, and particularly to a pressure proportioning arrangement having a controlled compensating means for vehicle weight shifting under decelerating conditions.

It is well known in the automotive industry that the braking effect of which a wheel is capable depends upon the weight carried by that wheel. Under static conditions, the relative weights borne by the front and rear wheels of a vehicle are known or can be easily determined. However, during vehicle deceleration, a portion of the weight normally borne by the rear wheels will shift to the front wheels and it is desirable to proportionally increase the braking effect at the front wheels relative to that at the rear wheels. If this is not accomplished, under some vehicle decelerating conditions the rear wheels will skid substantially prior to the point at which the front wheels begin to skid. This condition will not only produce excessive wear on the front wheel brake linings because of the greater vehicle weight borne by the front wheels and require the application of greater pedal effort to bring the vehicle to a halt, but also the rear wheel skidding causes a loss of the frictional coefficient between the rear wheels and the road. This in turn will cause the rear wheels to attempt to overrun the front wheels with resulting sidewise vehicle skidding or "fishtailing."

Various devices have been proposed to proportion the braking pressures to the front and rear wheel cylinders in relation to the vehicle deceleration rate. These range from devices which simply eliminate further increases in rear wheel brake cylinder pressure when deceleration becomes excessive to devices of a much more complicated nature which vary both front and rear wheel pressure from the pressure of a master cylinder with which the device is used. While these devices have met with varying degrees of success, they have generally been designed for use in conjunction with a standard master cylinder. The present invention can be embodied directly in or adapted for operation conjointly with a master cylinder and is designed to vary the pressures delivered to the front and rear wheel brake cylinders.

The present invention provides for a relatively simple brake pressure proportioning master cylinder adapted to pressurize the front and rear wheel brake cylinders equally until a predetermined master cylinder or pedal pressure is realized which will normally correspond to a given rate of vehicle deceleration. At this point, any further increase in pedal pressure will cause the master cylinder to deliver a quantity of fluid to the front brake cylinders which will pressurize the front brake cylinders to a greater degree than the rear brake cylinders. Should the quantities of fluid displaced fail to produce the desired pressure relationship between the front and rear brakes, the device will automatically correct this error by relieving the pressure in one set of brakes and increasing the pressure in the other.

It is another object of the present invention to provide an improved brake pressure proportioning device of the above character wherein the ratio of front to rear wheel brake cylinder pressures increases in accordance with increased vehicle deceleration.

It is a further object of the present invention to provide an improved brake pressure proportioning master cylinder for displacing varying amounts of fluid to the front and rear brake cylinders which has an automatic self-governing control to maintain the pressures produced in a desired relation.

It is a further object of the present invention to provide an improved brake pressure proportioning device of the above character which will permit equal pressurization of the front and rear wheel brake cylinders for applied pedal efforts below a preselected level.

It is a further object of the present invention to provide an improved brake pressure proportioning device of the above character which may be incorporated directly in or adapted for operation conjointly with the master cylinder assembly.

It is still a further object of the present invention to provide an improved brake pressure proportioning device of the above character which is relatively inexpensive to manufacture, reliable in operation and efficient in use.

Further objects and advantages of the present invention will become more apparent from the following detailed description taken in conjunction with the drawings in which:

FIGURE 1 is a sectional view of preferred form of brake pressure proportioning device embodying the principles of the present invention;

FIG. 2 is a graph showing the ratio of the rear wheel cylinder pressure to front wheel cylinder pressure during vehicle deceleration for the device of the present invention; and FIG. 3 is a view similar to FIG. 1 illustrating a modified form of the present invention.

Referring now more specifically to the drawings, and especially FIG. 1, a master cylinder housing 11 is shown as including a hydraulic fluid reservoir 13 covered by a closure member 15. The housing 11 is formed with a stepped diameter bore construction including a large diameter bore 17 and a smaller diameter bore 19 separated by a radial shoulder 21. A first inlet opening 23 communicates the reservoir 13 with the large diameter bore 17 while the large and small diameter bores 17 and 19 are provided with outlet openings 22 and 24, respectively.

A guide member 25 is slidably disposed in the large diameter bore 17 and is connected to a push rod 27 in turn operatively connected to a conventional brake pedal 29 either directly or through a conventional booster motor (not shown). A seal 31 is carried by the guide 25 at one end and engages the wall of the bore 17 while a snap ring 33 is positioned at one end of the bore 17 to prevent the guide 25 from being withdrawn out of the bore 17. A second inlet opening 37 communicates the reservoir 13 with the large diameter bore intermediate the ends of the guide 25 to maintain atmospheric pressure thereat.

The other end of the guide 25 abuts one of a piston 35 slidably disposed in the large diameter bore 17. The piston 35 is of general hollow configuration and has an annular flange 39 slidably engaging the wall of the bore 17. A conventional seal 41 is carried by the piston 35 and engages the wall of the bore 17 to prevent the flow of fluid therepast.

Slidably disposed within the piston 35 is a member 43, which may be termed either a valve member or a second piston, depending upon which of its two functions is to be emphasized. The piston or valve member 43 is provided with the tapered bore 55 when the piston is moved forwardly of the member 43. A compression spring 63 is caged between the forward end of the piston 35 and a radial shoulder 65 formed on the member 43. This spring will normally maintain the piston 35 and the member 43 in the position shown in FIG. 1 wherein fluid can flow through a bypass 66 formed by the tapered bore portion 55, the groove 57 and the bore 47 through the member 43. However, when the piston 35 is moved in a left-hand direction relative to the member 43, the O-ring 59 engages the inner wall of the piston 35 rearwardly of the tapered portion 55 and prevents the flow of fluid to the smaller diameter bore 19.

The first outlet opening 22 formed in the master cylinder housing 11 communicates the large diameter bore 17 with a pair of front wheel brake cylinders 67 through a conduit 69. Similarly, the second outlet opening 24 communicates the smaller diameter bore 19 with a pair of rear wheel brake cylinders 71 through a conduit 73. Conventional residual valves 75 may be positioned within counter bored portions 74 and 76 formed adjacent the outlet openings 22 and 24, respectively, to filter the fluid passing therethrough.

In use, initial actuation of the push rod 27 as by application of the brake pedal 29 imparts left-hand directional movement to the guide 25 and therefore to the piston 35. Hydraulic fluid is displaced through the outlet 22 and thence to the front wheel brake cylinders 67. At the same time, fluid in the large diameter bore 17 is displaced around the tapered bore 55 and slot 57, through the opening 49, the bores 47 and 19, and thence to the rear wheel brake cylinders 71 by way of the outlet 24 and conduit 73. However, after a predetermined initial braking effort, the piston 35 moves in a left-hand direction relative to the member 43 to compress the spring 63. This permits the O-ring 59 to engage the inner wall of the piston 35 rearwardly of the tapered bore 55, close the bypass 66 and prevents any further fluid from being displaced from the large diameter bore 17 to the smaller diameter bore 19. Additionally, the seal 41 is at this point past the outlet 23 and any further movement of the piston 35 and the member 43 in a left-hand direction pressurizes the hydraulic fluid already trapped in the front and rear brake cylinders, respectively.

After the predetermined initial braking effort has resulted in closure of the bypass 66 formed through a member 43, the system is essentially a closed one with the additional pressurization of the front wheel cylinders 67 being effected through pressurization of fluid by displacement of the piston 35 which has a cross-sectional area equal to that of the large diameter bore 17 less the cross-sectional area of the member 43. Additional pressurization of the rear wheel cylinders is effected through pressurization of fluid by displacement of the member 43. Ideally, the piston 35 and the valve member 43 move together after closure of the bypass 66 through the valve member. Thus, the ratio of the pressure at the front wheel cylinders to the pressure at the rear wheel cylinders increases with an increase in the master cylinder or pedal pressure since the cross-sectional area of the bore 17 less the cross-sectional area of the member 43 is greater than the cross-sectional area of the member 43. Therefore, after the predetermined initial braking effort has effected closure of the valve bypass 66, the braking effect realized at the front wheels increases relative to that realized at the rear wheels with an increase in the master cylinder or pedal pressure thereby resulting in the aforementioned desired braking effect being realized at the front and rear wheels.

The spring 63 is designed to permit the valve bypass 66 to close when the master cylinder pressure reaches a predetermined value which is indicative of the rate of vehicle deceleration at which the brake pressure proportioning device is to be brought into play. While the valve bypass 66 is open, the fluid pressure within the large diameter bore 17 and the small diameter bore 19 are equal and assuming that P equals the pressure in the master cylinder, $A_{43}$ equals the cross-sectional area of the member 43, $A_{65}$ equals the area of the shoulders 65 and $F_{63}$ equals the force of the spring 63, the bypass valve 66 will close when master cylinder pressure is raised to a level where $$P(A_{43}-A_{65})=F_{63}$$

Therefore, at a preselected pressure (P) in the master cylinder, the force of the spring 63 ($F_{63}$) is overcome and the member 43 is caused to move in a right-hand direction relative to the piston 35. When this occurs, O-ring 59 engages the inner wall of the piston 35 rearwardly of the tapered bore 55 and the system becomes a closed one as described above.

The spring 63 is designed to yield and permit valve bypass closure at a point of pedal pressure where the rate of vehicle deceleration causes a dynamic weight shift of sufficient magnitude as would ordinarily result in the premature rear wheel skidding condition set forth above. A further increase in the push rod force results in an increased braking effect realized at the front wheels which is greater than the increase of braking effect to the rear wheels.

When the force to the push rod is released, the piston 35 returns to its initial position by virtue of a relatively long and weak compression spring 77 having one end in engagement with the piston 35 and the other end in engagement with the seal 53. The action of this spring also returns the valve member 43 and the piston 25 to their initial positions shown in FIG. 1 but has substantially no effect on the design of the spring 63.

The device of the present invention is designed to be fully self-governing in that it establishes the proper pressure relationship between the front and rear wheel brake cylinders after bypass closing and maintains the desired relationship throughout vehicle deceleration. Thus, the annular shoulder 65 against which one end of the spring 63 abuts is also acted upon by the pressurized fluid within the large diameter bore 17. Assuming $A_{65}$ to be the cross-sectional area of this shoulder, $A_{43}$ to be the cross-sectional area of the valve member 43, $P_{19}$ to be the fluid pressure within the smaller diameter bore 19 after the valve bypass 66 has been closed, $P_{17}$ to be the fluid pressure within the large diameter bore 17 and $F_{63}$ to be the force of the spring 63, the following formula expresses the forces on the valve member 43 after closure of the valve bypass:

$$P_{19}A_{43}=[P_{17}A_{65}]+F_{63}$$

Therefore, assuming that the valve member areas and the spring 63 are designed to cause unitary movement of the piston 35 and valve member 43 after closing of the bypass, both sides of the force equation above are equal if the proper relationship exists between the front and rear wheel cylinder pressures $P_{17}$ and $P_{19}$, respectively. Thus, if the pressure to the rear wheel cylinders ($P_{19}$) falls below the design level, as for example by an insufficient amount of fluid being trapped in the bores 47 and 19 and in the conduit 73 before closure of the bypass 66, the pressure to the front wheel cylinders $P_{17}$ acting upon the shoulder 65 displaces the valve member 43 to the left relative to piston 35. Additional fluid flows through the now uncovered valve bypass opening 66 until the proper relationship between $P_{17}$ and $P_{19}$ is attained, at which time the bypass closes. Conversely, an insufficient pressurization of the front wheel cylinders ($P_{17}$) acting upon the shoulder 65 permits right-hand movement of the valve member 43 to further decrease the pressure to the rear wheel cylinders ($P_{19}$) relative to the front wheel cylinder pressurization ($P_{17}$). Thus, the predetermined pressure ratio between the front and rear wheel cylinders is effectively maintained throughout vehicle deceleration.

FIGURE 3 of the drawings illustrates a modified form of the present invention which is designed to effect the same brake pressure proportioning and self-governing action as the device of FIG. 1, wherein the self-governing device is operable in response to the fluid displacing means within the master cylinder assembly. As seen in FIG. 3, a master cylinder housing 111 includes a hydraulic fluid reservoir 113 covered by a closure member 115. The housing 111 has a stepped bore construction therein including a large diameter bore 117 and a small diameter bore 119 separated by a radial shoulder 121. A first inlet opening 123 communicates the reservoir 113 with the large diameter bore 117 and the large and small diameter bores 117 and 119 are provided with outlet passages 122 and 124, respectively.

A guide member 125 is slidably disposed in the large diameter bore 117 and is connected to a push rod 127, in turn operatively connected to a conventional brake pedal 129, either directly or through a conventional booster motor (not shown). A seal 131 is carried by the guide 125 at one end and engages the wall of the bore 117, while a snap ring 133 is positioned at one end of the bore 117 to prevent the guide 125 from being withdrawn out of the bore 117. A second inlet opening 137 communicates the reservoir 113 with the large diameter bore 117 intermediate the ends of the guide 125 to maintain atmospheric pressure thereat.

The other end of the guide 125 is formed with a recess 129, receiving and engaging one end of a piston member 143 movably disposed in the large diameter bore 117. A fluid displacing annular lip seal 141 is mounted on the piston 143 for sliding and sealing engagement with the wall of the bore 117. The seal 141 is retained in place on the piston 143 by a bearing ring 135 interposed between the seal and the end of the guide 125 and by a snap ring 145.

The other end of the piston 143 is slidably disposed in the small diameter bore 119. An annular O-ring seal 147 is positioned in a groove 148 in the piston 143 and engages the wall of the bore 119 to prevent the flow of fluid therepast.

The outlet passages 122 and 124 formed in the master cylinder housing 111 communicate the large and small diameter bores 117 and 119 with a valve bore 149 which preferably is formed in the master cylinder housing 111 but may, if desired, be in a housing separate and apart from the master cylinder housing. The valve bore 149 has a pair of outlet openings 151 and 153 which are connected by conduits 155 and 157, respectively, to pairs of front 159 and rear 161 wheel brake cylinders and is closed by a plug 162.

A valve member 163 is slidably disposed within the valve bore 149 and has a reduced diameter portion 165 slidable within a reduced diameter bore portion 167. An annular seal 169 carried by the valve member 163 engages the wall of the bore 149 and an annular seal 171 carried by the valve reduced diameter portion 165 engages the wall of the bore 167 to prevent the flow of fluid therepast. A compression spring 173 is caged between the end of the valve reduced diameter portion 165 and the inner end wall of the bore 167. This spring 173 normally maintains the valve member 163 in the position illustrated in FIG. 3 wherein fluid can flow through a bypass 175 formed by a groove 179 formed in the valve reduced diameter portion 165, a radial passage 177, and an axial passage 181 formed in the valve member 163. However, when the valve member 163 is moved in a right-hand direction, as seen in FIG. 3, an O-ring seal 183 carried by the valve reduced diameter portion 165 engages the wall of the bore 167 and the recess 177 and closes the bypass 175.

In use, initial actuation of the push rod 127 by application of the brake pedal 129 imparts left-hand directional movement to the guide 125 and to the piston member 143. Hydraulic fluid is displaced through the passages 122 and 124 to the valve bore 149 and to the front 159 and rear 161 wheel brake cylinders by way of outlets 151 and 153 and conduits 155 and 157, respectively. However, after a predetermined initial braking effort, the valve member 163 moves in a right-hand direction within the bore 149 to compress the spring 173. This permits the seal 183 to engage the wall of the bore 167, thereby closing the bypass 175 and preventing any further flow of fluid therethrough. Additionally, the seal 141 is at this point past the outlet 123 and any further movement of the piston 143 and seal 141 in a left-hand direction pressurizes the hydraulic fluid already trapped in the rear and front wheel brake cylinders, respectively.

After the predetermined initial braking effort has resulted in closure of the bypass 175, the system is essentially a closed one with the additional pressurization of the front wheel brake cylinders 159 being effected through pressurization of fluid by displacement of the seal 41 which has a cross-sectional area equal to the cross-sectional area of the large diameter bore 117 less the cross-sectional area of the piston 143. The additional pressurization of the rear wheel brake cylinders 161 is effected through pressurization of fluid by displacement of the piston 143. Thus, the ratio of the pressure at the front wheel cylinders to the pressure at the rear wheel cylinders increases with an increase in the master cylinder or pedal pressure, since the cross-sectional area of the bore 117 less the cross-sectional area of the piston 143 is greater than the cross-sectional area of the piston 143. Therefore, after the predetermined initial braking effort has effected closure of the valve bypass 175, the pressure realized at the front wheel cylinders increases relative to that realized at the rear wheel cylinders with an increase in the master cylinder or pedal pressure, thereby resulting in the aforementioned desired braking effect being realized at the front and rear wheels.

As was the case with the valve spring 63 of the device of FIG. 1, the valve spring 173 is designed to permit the valve bypass 175 to close when the master cylinder pressure reaches a predetermined value which is indicative of the rate of vehicle deceleration at which the brake pressure proportioning device is to be brought into play. While the bypass 175 is open, the fluid pressure on both sides of the valve member 163 and in the large and small diameter bores 117 and 119 are equal. Assuming that P equals the master cylinder pressure, $A_{163}$ equals the cross-sectional area of the valve 163, $A_{165}$ equals the cross-sectional area of the valve reduced diameter portion 165 and $F_{173}$ equals the force of the spring 173, the bypass 175 closes when the master cylinder pressure is raised to a level where $PA_{163} = F_{173} + P(A_{163} - A_{165})$ or when $F_{173} = PA_{165}$. Therefore, at a preselected master cylinder pressure (P), the spring force $F_{173}$ is overcome and the bypass 175 closed, rendering the system a closed one as described above.

As in the case of the spring 63 of FIG. 1, the spring 173 is designed to yield and permit valve bypass closure at a point of pedal pressure where the rate of vehicle deceleration causes a dynamic weight shift of sufficient magnitude as would ordinarily result in the premature rear wheel skidding. A further increase in the push rod force results in an increased braking effect realized at the front wheels which is greater than the increase of braking effect to the rear wheels.

When the pedal 129 and push rod 127 are released, the piston 143 returns to its original position, shown in FIG. 2, by virtue of a relatively long and weak compression spring 185 caged between the snap ring 145 and the radial shoulder 121 between the bores 117 and 119. Also, the master cylinder pressure P is relieved when the piston 143 is returned, thereby allowing the spring 173 to return the valve member 163 in a left-hand direction and open the bypass 175.

As was the case in the device of FIG. 1, the device of FIG. 3 is fully self-governing to establish and maintain a predetermined relationship between the pressurizations of the front and rear wheel brake cylinders throughout vehicle deceleration. Thus, assuming $P_f$ to be the fluid pressure to the front wheel brake cylinders, which is also the pressure tending to move the valve member 163 in a left-hand direction, $P_r$ to be the fluid pressure to the rear wheel brake cylinders, which also tends to move the valve member in a right-hand direction, $F_{173}$ to be the force of the spring 173, and the cross-sectional areas of the valve member to be those assumed above, the following formula expresses the forces on the valve member 163 after closure of the valve bypass 175:

$$P_r A_{163} = P_f(A_{163} - A_{165}) + F_{173}$$

Therefore, assuming that the valve member areas and the spring 173 are designed to permit additional pressurization of the front and rear wheel brake cylinders by further movement of the piston 143 in a left-hand direction after valve bypass closure without further movement of the valve member 163, both sides of the force equation above are equal if the proper relationship exists between the front and rear wheel cylinder pressure $P_f$ and $P_r$, respectively. Thus, if the pressure to the rear wheel cylinders ($P_r$) falls below the design level, as, for example, by an insufficient amount of fluid being trapped in the bore 119, the valve bore 149 to the left of the valve member 163 and the conduit 157 before closure of the bypass 175, the pressure to the front wheel cylinders $P_f$, acting upon the right-hand face of the valve member 163, displaces the valve member in a left-hand direction. Additional fluid flows through the now opened valve bypass 175 until the proper relationship between $P_f$ and $P_r$ is attained at which time the bypass closes. Conversely, an insufficient pressurization of the front wheel brake cylinders ($P_f$), which acts upon the left-hand face of the valve member 163, permits movement of the valve member in a right-hand direction to further decrease the pressure to the rear wheel cylinders ($P_r$) relative to the front wheel cylinders. Thus, the predetermined pressure ratio between the front and rear wheel cylinders is effectively maintained throughout vehicle deceleration.

FIG. 2 of the drawings is a graphic representation of the ratio of rear wheel cylinder pressure to front wheel cylinder pressure for the device of FIG. 1. Line S represents the standard rear to front wheel cylinder pressure obtainable without using any vehicle weight shifting compensating device. Line I represents the ideal ratio shown as departing from the standard ratio at a point X. This point is selected to correspond to a level of a dynamic weight shift at which the ratio of braking pressures is desirably reproportioned for maximum efficiency and safety. Line C represents the ratio of rear to front wheel brake cylinder pressure obtained in the device of the present invention. It will be observed that this ratio more closely follows the ideal brake pressure ratio I throughout the major portion of the braking range and that the point of departure from the standard ratio S substantially coincides with the point X.

By the present invention, therefore, there has been provided an improved brake pressure proportioning device for automotive hydraulic brake assemblies which is self-governing in operation to control the relative braking effects realized at the front and rear wheels. While preferred embodiments of the present invention have been illustrated and described in detail, various additions, substitutions, modifications and omissions may be made thereto without departing from the spirit of the invention as encompassed by the appended claims.

What is claimed is:

1. In a hydraulic brake system for a vehicle having first and second sets of brake cylinders,
   a master cylinder operable to transmit a first given quantity of fluid to said first set of brake cylinders and a second given quantity of fluid to said second set of brake cylinders to produce a higher pressure in said second set of brake cylinders,
   said master cylinder having a first piston operable to pressurize fluid to at least one of said sets of brake cylinders,
   a second piston movable independently of said first piston and exposed to the fluid pressure of one of said sets of brake cylinders on one side thereof and to the fluid pressure of the other said set of brake cylinders on the other side thereof, and
   bypass means associated with said second piston providing fluid communication between said first and second sets of said brake cylinders,
   said second piston being movable in response to different fluid pressure first to close said bypass and thereafter to pressurize fluid in one of said sets of brake cylinders and relieve the pressure of fluid in the other of said sets of brake cylinders.

2. In a hydraulic brake system for a vehicle having first and second sets of brake cylinders,
   a master cylinder operable to transmit a first given quantity of fluid to said first set of brake cylinders and a second given quantity of fluid to said second set of brake cylinders to produce a higher pressure in said second set of brake cylinders,
   said master cylinder having a first piston operable to pressurize fluid to at least one of said sets of brake cylinders,
   a second piston movable independently of said first piston and exposed to the fluid pressure of one of said sets of brake cylinders on one side thereof and to the fluid pressure of the other said set of brake cylinders on the other side thereof,
   bypass means associated with said second piston providing fluid communication between said first and second sets of said brake cylinders, and
   resilient means biasing said second piston to a position normally maintaining said bypass open,
   said second piston being movable in response to different fluid pressure first to close said bypass and thereafter to pressurize fluid in one of said sets of brake cylinders and relieve the pressure of fluid in the other of said sets of brake cylinders.

3. In a hydraulic brake system for a vehicle having first and second sets of brake cylinders,
   a master cylinder having fluid displacing means therein provided with a first portion for pressurizing fluid to said first set of brake cylinders and a second portion for pressurizing fluid to said second set of brake cylinders at a higher pressure than said first set of brake cylinders, and
   bypass means connecting said first and second sets of cylinders,
   said bypass means including relatively movable first and second portions normally maintained in an open position by a resilient means interposed therebetween,
   said bypass portions being relatively movable against said resilient means in response to a predetermined pressure differential between said sets of brake cylinders to close said bypass.

4. In a hydraulic brake system for a vehicle having first and second sets of brake cylinders,
   a master cylinder having fluid displacing means therein provided with a first portion for pressurizing fluid to said first set of brake cylinders and a second portion for pressurizing fluid to said second set of brake cylinders at a higher value than fluid in said first set of brake cylinders, and
   bypass means connecting said first and second sets of cylinders,
   said bypass means including relatively movable first and second portions normally maintained in an open position by a resilient means interposed therebetween,
   said bypass portions being relatively movable against said resilient means to close said bypass and being movable thereafter to increase or relieve the pressurization in one of said sets of brake cylinders while simultaneously having the opposite effect on the other set of brake cylinders,
   the relative movement of said bypass portions being in response to a predetermined pressure differential between said first and second sets of brake cylinders.

5. In a hydraulic brake system for a vehicle having first and second sets of brake cylinders,
   a master cylinder having fluid displacing means therein provided with a first portion for displacing fluid to said first set of brake cylinders and a second portion having a smaller cross-sectional area than said first portion,
   movable bypass means permitting the displacement of fluid to said second set of cylinders by the first portion of said fluid displacing means,
   resilient means normally biasing said bypass means toward an open position,
   said bypass means being movable against said resilient means to a closed position after a predetermined initial braking effort,
   said first and second portions of said fluid displacing means being movable to pressurize fluid to said first and second sets of brake cylinders, respectively, after closing of said bypass,
   the ratio of the pressure to said first set of brake cylinders to pressure to said second set of brake cylinders increasing with further braking effort.

6. In a hydraulic brake system for a vehicle having first and second sets of brake cylinders,
   a master cylinder having fluid displacing means therein provided with a first portion for displacing fluid to said first set of brake cylinders and a second portion having a smaller cross-sectional area than said first portion,
   bypass means permitting the displacement of fluid to said second set of cylinders by the first portion of said fluid displacing means,
   said bypass means including relatively movable first and second portions normally maintained in an open position by a resilient means interposed therebetween,
   said bypass portions being relatively movable against said resilient means to close said bypass after a predetermined initial braking effort thereby establishing a preselected ratio of fluid pressure to said second set of brake cylinders to fluid pressure to said first set of brake cylinders,
   said first and second portions of said fluid displacing means being movable to pressurize fluid to said first and second sets of brake cylinders, respectively, after closing of said bypass,
   the ratio of the pressure to said first set of brake cylinders to pressure to said second set of brake cylinders increasing with further braking effort,
   and means for reopening said bypass in response to the ratio of fluid pressure to said second set of brake cylinders to fluid pressure to said first set of brake cylinders falling below said preselected level.

7. In a hydraulic brake system for a vehicle having first and second sets of brake cylinders,
   a master cylinder having fluid displacing means therein provided with a first portion for displacing fluid to said first set of brake cylinders and a second portion having a smaller cross-sectional area than said first portion,
   bypass means permitting the displacement of fluid to said second set of cylinders by the first portion of said fluid displacing means,
   said bypass means including relatively movable first and second portions normally maintained in an open position by a resilient means interposed therebetween,
   said bypass portions being relatively movable a predetermined amount against said resilient means to close said bypass after a predetermined initial braking effort thereby establishing a preselected ratio of fluid pressure to said second set of brake cylinders to fluid pressure to said first set of brake cylinders,
   said first and second portions of said fluid displacing means being movable to pressurize fluid to said first and second sets of brake cylinders, respectively, after closing of said bypass,
   the ratio of the pressure to said first set of brake cylinders to pressure to said second set of brake cylinders increasing with further braking effort,
   said bypass portions being movable against said resilient means beyond said predetermined amount in response to the ratio of fluid pressure to said second set of brake cylinders to fluid pressure to said first set of brake cylinders exceeding said preselected level.

8. In a hydraulic brake system for a vehicle having first and second sets of brake cylinders,
   a master cylinder having fluid displacing means therein provided with a first portion for displacing fluid to said first set of brake cylinders,
   a second portion of said fluid displacing means having a smaller cross-sectional area than said first portion movably mounted relative to said first portion and having a bypass therethrough permitting the displacement of fluid to said second set of brake cylinders by said first portion,
   resilient means normally biasing said first and second portions of said fluid displacing means toward a bypass open position,
   said first and second portions of said fluid displacing means being movable against said resilient means to close said bypass after a predetermined initial braking effort.

9. In a hydraulic brake system for a vehicle having first and second sets of brake cylinders,
   a master cylinder having a fluid displacing means therein provided with a first portion for displacing fluid to a first set of said brake cylinders,
   a second portion of said fluid displacing means having a smaller cross-sectional area than said first portion movably mounted relataive to said first portion and having a bypass therethrough permitting fluid displacement to said second set of brake cylinders by said first portion,
   compression spring means interposed between said first and second portions normally biasing said first and second portions toward a bypass opening position,
   said first and second portions of said fluid displacing means being movable in a direction compressing said spring means to close said bypass after a predetermined initial braking effort thereby establishing a preselected ratio of fluid pressure to said second set of brake cylinders to fluid pressure to said first set of brake cylinders.

10. In a hydraulic brake system for a vehicle having first and second sets of brake cylinders,
    a master cylinder having a fluid displacing means therein provided with a first portion for displacing fluid to a first set of said brake cylinders,
    a second portion of said fluid displacing means having a smaller cross-sectional area than said first portion being movably mounted relative to said first portion and having a bypass therethrough permitting fluid displacement to said second set of brake cylinders by said first portion,
    resilient means normally biasing said first and second portions toward a bypass opening position,
    said first and second portions of said fluid displacing means being movable against said resilient means to close said bypass after a predetermined initial braking effort thereby establishing a preselected ratio of fluid pressure to said second set of brake cylinders to fluid pressure to said first set of brake cylinders,
    and means for reopening said bypass in response to the ratio of fluid pressure to said second set of brake cylinders to fluid pressure to said first set of brake cylinders falling below said preselected level.

11. In a hydraulic brake system for a vehicle having first and second sets of brake cylinders, a master cylinder having a fluid displacing means therein provided with a first portion for displacing fluid to a first set of said brake cylinders, a second portion of said fluid displacing means having a smaller cross-sectional area than said first portion being movably mounted relative to said first portion and having a bypass therethrough permitting fluid displacement to said second set of brake cylinders by said first portion, resilient means normally biasing said first and second portions toward a bypass opening position, said first and second portions of said fluid displacing means being movable against said resilient means and relative to each other a predetermined amount to close said bypass after a predetermined initial braking effort thereby establishing a preselected ratio of fluid pressure to said second set of brake cylinders to fluid pressure to said first set of brake cylinders, said first and second portions being thereafter movable as a unit upon application of further braking effort, and pressure responsive means on said fluid displacing means adapted to impart further relative movement between said first and second portions in response to the ratio of fluid pressure to said second set of brake cylinders to fluid pressure to said first set of brake cylinders exceeding said preselected level.

12. In a hydraulic brake system for a vehicle having first and second sets of brake cylinders, a master cylinder having a longitudinally extending bore provided with spaced first and second outlets adapted to deliver fluid to said first and second sets of brake cylinders, respectively, a fluid displacing means having a first portion slidably disposed in said bore for displacing fluid to said first set of brake cylinders, a second portion of said fluid displacing means having a smaller cross-sectional area than said first portion movably disposed relative to said first portion and having a bypass therethrough permitting fluid displacement to said second set of brake cylinders by said first portion, resilient means interposed between said first and second portions and normally biasing said portions to a bypass opening position, said first and second portions being movable relative to each other against said resilient means to close said bypass after a predetermined initial braking effort, said first and second portions being thereafter movable as a unit to pressurize fluid to said first and second sets of brake cylinders, respectively, the ratio of the pressure to said first set of brake cylinders to pressure to said second set of brake cylinders increasing with further braking effort.

13. In a hydraulic brake system for a vehicle having first and second sets of brake cylinders, a master cylinder having a longitudinally extending bore provided with spaced first and second outlets adapted to deliver fluid to said first and second sets of brake cylinders, respectively, a fluid displacing means having a first portion slidably disposed in said bore for displacing fluid to said first set of brake cylinders, a second portion of said fluid displacing means having a smaller cross-sectional area than said first portion movably disposed relative to said first portion and having a bypass therethrough permitting fluid displacement to said second set of brake cylinders by said first portion, resilient means interposed between said first and second portions and normally biasing said portions to a bypass opening position, said first and second portions being movable relative to each other against said resilient means to close said bypass after a predetermined initial braking effort thereby establishing a preselected fluid pressure ratio between said first and second sets of brake cylinders, respectively, said first and second portions being thereafter movable as a unit to pressurize fluid to said first and second sets of brake cylinders, respectively, the ratio of the pressure to said first set of brake cylinders to pressure to said second set of brake cylinders increasing with further braking effort, and means for reopening said bypass in response to said fluid pressure ratio between said first and second sets of brake cylinders falling below said preselected level.

14. In a hydraulic brake system for a vehicle having first and second sets of brake cylinders, a master cylinder having a longitudinally extending bore provided with spaced first and second outlets adapted to deliver fluid to said first and second sets of brake cylinders, respectively, a fluid displacing means having a first portion slidably disposed in said bore for displacing fluid to said first set of brake cylinders, a second portion of said fluid displacing means having a smaller cross-sectional area than said first portion movably disposed relative to said first portion and having a bypass therethrough permitting fluid displacement to said second set of brake cylinders by said first portion, resilient means interposed between said first and second portions and normally biasing said portions to a bypass opening position, said first and second portions being movable relative to each other a predetermined amount against said resilient means to close said bypass after a predetermined initial braking effort thereby establishing a preselected fluid pressure ratio between said first and second sets of brake cylinders, respectively, said first and second portions being thereafter movable as a unit to pressurize fluid to said first and second sets of brake cylinders, respectively, the ratio of the pressure to said first set of brake cylinders to pressure to said second set of brake cylinders increasing with further braking effort, and said fluid displacing means being pressure responsive to permit further relative movement between said first and second portions in response to the fluid pressure ratio between said first and second sets of brake cylinders exceeding said preselected level.

15. In a hydraulic brake system for a vehicle having first and second sets of brake cylinders, a master cylinder having a pair of longitudinally extending spaced bore portions provided with first and second outlets adapted to deliver fluid to said first and second sets of brake cylinders, respectively, a fluid displacing means having a first portion slidably disposed in a first one of said bores for displacing fluid to said first set of brake cylinders, a second portion of said fluid displacing means having a smaller cross-sectional area than said first portion disposed in said first bore and movably carried by said first portion and having a bypass therethrough opening into the other of said bores permitting fluid displacement to said second set of brake cylinders by said first portion, compression spring means interposed between said first and second portions and normally biasing said portions to a bypass opening position, said first and second portions being movable relative to each other a predetermined amount in a direction compressing said spring means to close said bypass after a predetermined initial braking effort thereby establishing a preselected fluid pressure ratio between said first and second sets of brake cylinders, respectively, said first and second portions being thereafter movable as a unit to pressurize fluid to said first and second sets of brake cylinders, respectively, the ratio of the pressure to said first set of brake cylinders to pressure to said second set of brake cylinders increasing with further braking effort, means for reopening said bypass in response to said fluid pressure ratio between said first and second sets of brake cylinders falling below said preselected level, and said fluid displacing means being pressure responsive to permit further relative movement between said first and second portions after bypass closure in response to the fluid pressure ratio between said first and second sets of brake cylinders exceeding said preselected level.

16. In a hydraulic brake system for a vehicle having first and second sets of brake cylinders, a master cylinder having a pair of longitudinally extending spaced bore portions provided with first and second outlets adapted to deliver fluid to said first and second sets of brake cylinders, respectively, a fluid displacing means having a first portion slidably disposed in a first one of said bores for displacing fluid to said first set of brake cylinders, a second portion of said fluid displacing means having a smaller cross-sectional area than said first portion disposed in said first bore and slidable within said first portion and having a bypass therethrough opening into the other of said bores permitting fluid displacement to said second set of brake cylinders by said first portion, compression spring means interposed between said first portion and a radial shoulder on said second portion and normally biasing said portions to a bypass opening position, said first and second portions being movable relative to each other a predetermined amount in a direction compressing said spring means to close said bypass after a predetermined initial braking effort thereby establishing a preselected fluid pressure ratio between said first and second sets of brake cylinders, respectively, said first and second portions being thereafter movable as a unit to pressurize fluid to said first and second sets of brake cylinders, respectively, the ratio of the pressure to said first set of brake cylinders to pressure to said second set of brake cylinders increasing with further braking effort, means for reopening said bypass in response to said fluid pressure ratio between said first and second sets of brake cylinders falling below said preselected level, and said fluid displacing means being pressure responsive to permit further relative movement between said first and second portions after bypass closure in response to the fluid pressure ratio between said first and second sets of brake cylinders exceeding said preselected level.

17. In a hydraulic brake system for a vehicle having first and second sets of brake cylinders, a master cylinder having a pair of longitudinally extending spaced bore portions, a valve bore communicating with said spaced bore portions and provided with first and second outlets adapted to deliver fluid to said first and second sets of brake cylinders, respectively, a fluid displacing means having a first portion slidably disposed in a first one of said longitudinal bores for displacing fluid to said valve bore and to said first set of brake cylinders, valve means positioned within said valve bore and having a bypass therethrough permitting fluid displacement to said second set of brake cylinders by said first portion and a second portion of said fluid displacing means slidably disposed in the other of said longitudinal bores, said second portion of said fluid displacing means having a smaller cross-sectional area than said first portion, resilient means normally biasing said valve means to a bypass opening position, said valve means being movable against said resilient means to close said bypass after a predetermined initial braking effort thereby establishing a preselected fluid pressure ratio between said first and second sets of brake cylinders, respectively.

18. In a hydraulic brake system for a vehicle having first and second sets of brake cylinders, a master cylinder having a pair of longitudinally extending spaced bore portions, a valve bore communicating with said spaced bore portions and provided with first and second outlets adapted to deliver fluid to said first and second sets of brake cylinders, respectively, a fluid displacing means having a first portion slidably disposed in a first one of said longitudinal bores for displacing fluid to said valve bore and to said first set of brake cylinders, valve means positioned within said valve bore and having a bypass therethrough permitting fluid displacement to said second set of brake cylinders by said first portion and a second portion of said fluid displacing means slidably disposed in the other of said longitudinal bores, said second portion of said fluid displacing means having a smaller cross-sectional area than said first portion, resilient means normally biasing said valve means to a bypass opening position, said valve means being movable against said resilient means to close said bypass after a predetermined initial braking effort thereby establishing a preselected fluid pressure ratio between said first and second sets of brake cylinders, respectively, said fluid displacing means being thereafter movable with said first and second portions pressurizing fluid to said first and second sets of brake cylinders, respectively, The ratio of the pressure to said first set of brake cylinders to pressure to said second set of brake cylinders increasing with further braking effort, and means for reopening said bypass in response to said fluid pressure ratio between said first and second sets of brake cylinders falling below said preselected level.

19. In a hydraulic brake system for a vehicle having first and second sets of brake cylinders, a master cylinder having a pair of longitudinally extending spaced bore portions, a valve bore communicating with said spaced bore portions and provided with first and second outlets adapted to deliver fluid to said first and second sets of brake cylinders, respectively, a fluid displacing means having a first portion slidably disposed in a first one of said longitudinal bores for displacing fluid to said valve bore and to said first set of brake cylinders, valve means positioned within said valve bore and having a bypass therethrough permitting fluid displacement to said second set of brake cylinders by said first portion and a second portion of said fluid displacing means slidably disposed in the other of said longitudinal bores, said second portion of said fluid displacing means having a smaller cross-sectional area than said first portion, resilient means normally biasing said valve means to a bypass opening position, said valve means being movable a preselected amount against said resilient means to close said bypass after a predetermined initial braking effort thereby establishing a preselected fluid pressure ratio between said first and second sets of brake cylinders, respectively, said fluid displacing means being thereafter movable with said first and second portions pressurizing fluid to said first and second sets of brake cylinders, respectively, the ratio of the pressure to said first set of brake cylinders to pressure to said second set of brake cylinders increasing with further braking effort, said valve means being pressure responsive to permit further relative movement against said resilient means after bypass closure in response to the fluid pressure ratio between said first and second sets of brake cylinders exceeding said preselected level.

No references cited.

JULIUS E. WEST, *Primary Examiner.*